Patented Oct. 11, 1949

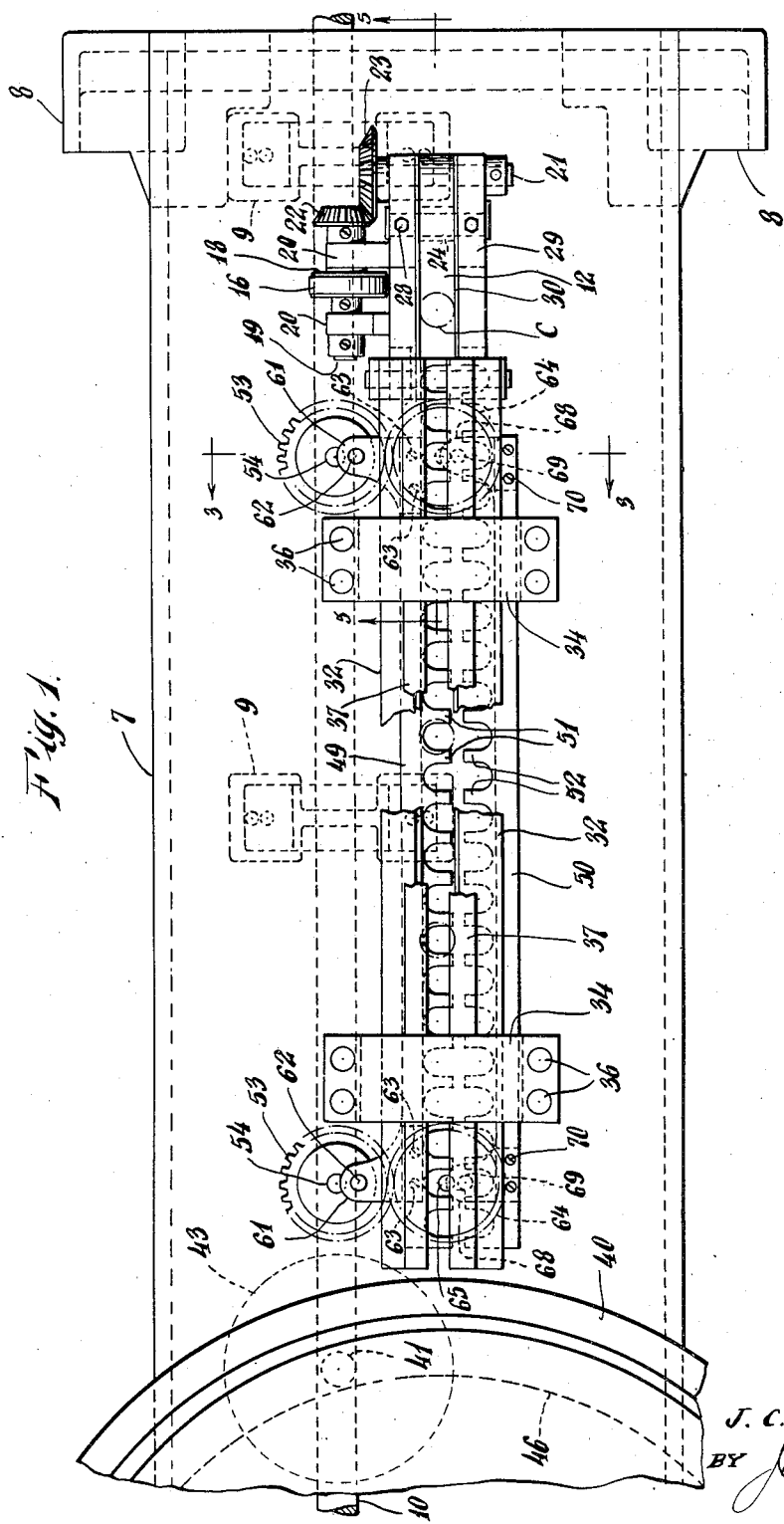

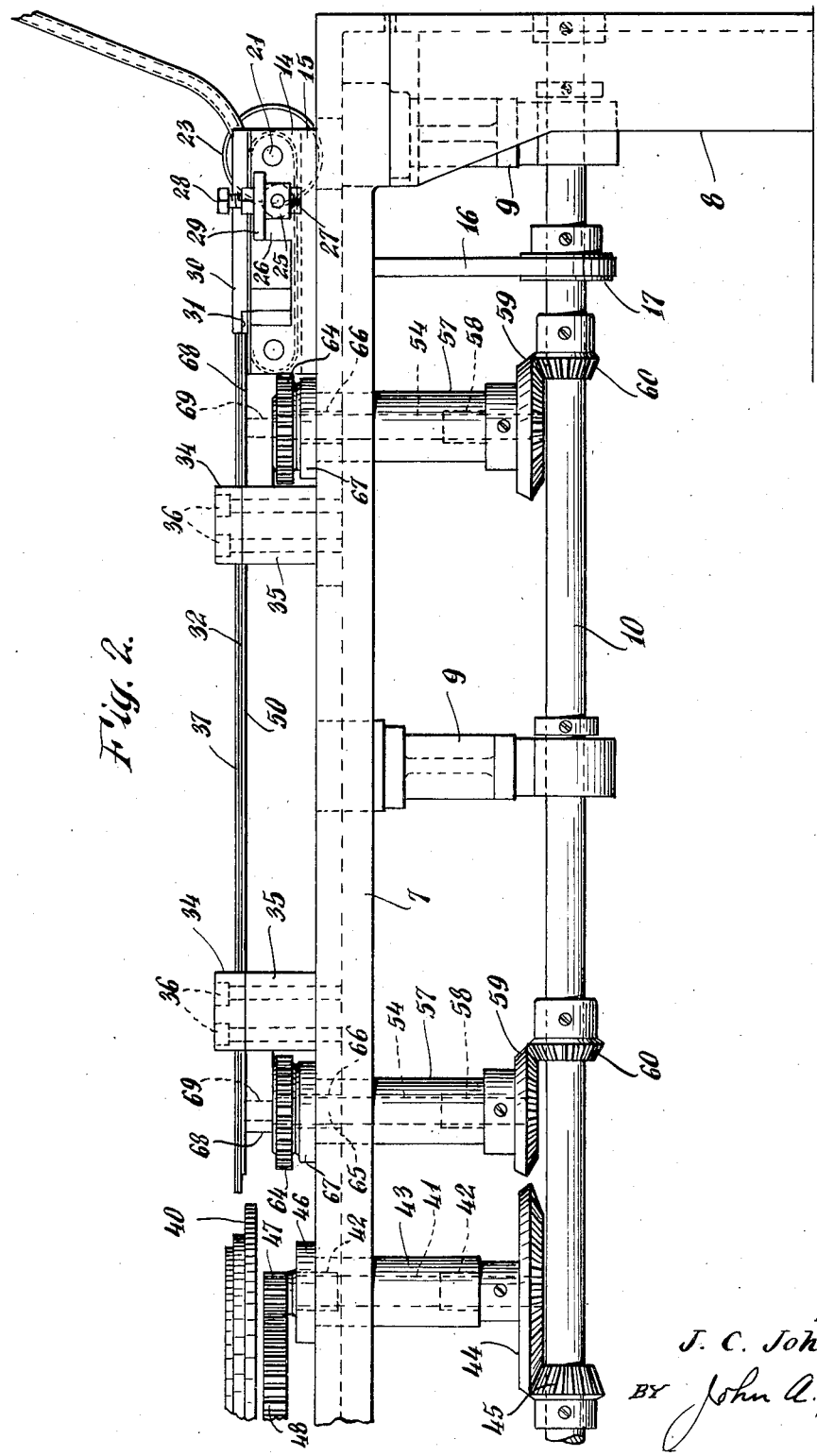

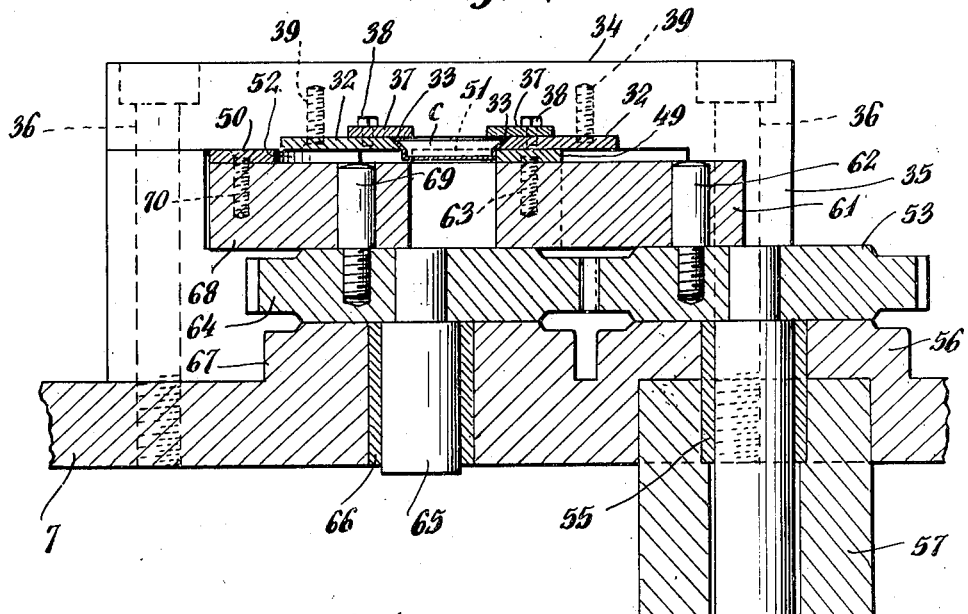
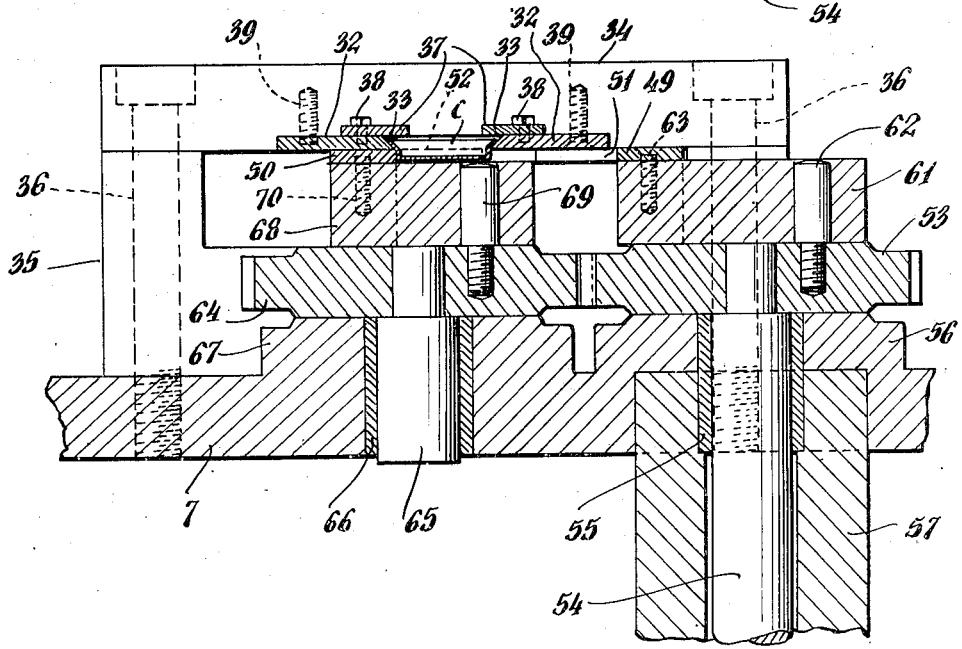

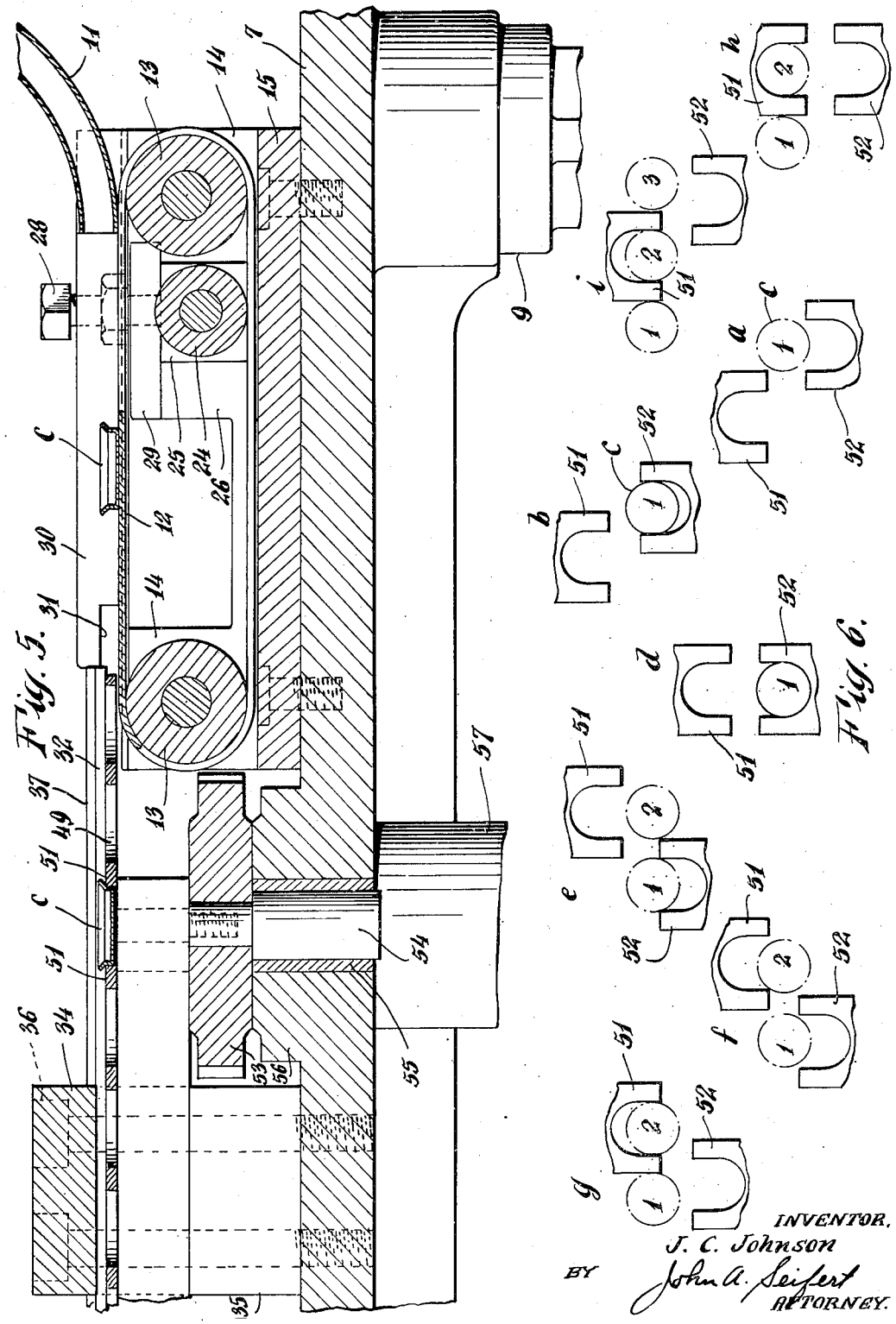

2,484,095

UNITED STATES PATENT OFFICE 2,484,095

CONVEYER APPARATUS FOR USE IN THE ASSEMBLY OF CLOSURE CAPS

John C. Johnson, East Hempstead, N. Y., assignor of one-half to Walter H. Johnson, Kings Point, N. Y.

Application June 28, 1946, Serial No. 680,315

5 Claims. (Cl. 198—106)

This invention relates to apparatus for assembling sealing pads and/or protective spots on the sealing pads in closure caps of the type commonly termed "crowns" having the flaring marginal portion of the flange arranged with corrugations or ruffles, and particularly to the feeding or conveying of the closure caps relative to devices for depositing adhesive in the closure caps, for creating a heated zone to render the adhesive tacky, for inserting sealing pads in the closure caps in contact with the tacky adhesive and/or for applying protective spots on the sealing pads.

To increase the number of closure caps assembled in a given length of time, it has been the practice to continuously feed the closure caps relative to the assembling devices by means of an endless sprocket chain arranged with closure cap carrying seats. It has been found that by the use of said sprocket chains or other similar flexible conveyers, the closure caps are positioned out of register with the assembling devices which is caused by the stretching of said flexible conveyers or the expanding and contracting of the flexible conveyers by the heat of the heated zone, and said stretching and/or expanding and contracting of the flexible conveyers requires frequent adjustment thereof which tends to decrease rather than increase the number of closure caps assembled within a given period of time.

It is an object of this invention to provide means to continuously feed closure caps relative to the assembling devices of the apparatus without the need of frequent shut downs of the apparatus for adjusting the closure cap feeding means to position the closure caps in proper register with the assembling devices.

It is another object of the invention to provide such closure cap feeding means without increasing the structural cost of the apparatus.

Other objects and advantages of the invention will hereinafter appear.

In the drawings accompanying and forming a part of this application, Figure 1 is a plan view of part of a closure cap assembling apparatus arranged with my improved closure cap feeding means.

Figure 2 is a side elevational view looking at the bottom of Figure 1.

Figure 3 is a cross sectional view, on an enlarged scale, of the feeding means taken on the line 3—3 of Figure 1 looking in the direction of the arrows.

Figure 4 is a view similar to Figure 3 showing the feeding means in another feeding position.

Figure 5 is a longitudinal sectional view, on an enlarged scale, taken on the line 5—5 of Figure 1 looking in the direction of the arrows to show the relationship between means for delivering closure caps to the feeding means and the feeding means.

Figure 6 is a fragmentary view of a series of positions of the first pair of fingers of a pair of rack bars constituting the feeding means of the invention to show the progressive steps of receiving closure caps from the closure cap delivery means and advancing said closure caps from said delivery means.

The embodiment of the invention is shown in connection with a closure cap assembling apparatus having the assembling devices omitted, such assembling devices being a device for depositing adhesive in closure caps, a device for creating a heated zone to render the adhesive in the closure caps viscous or tacky, a device for delivering sealing or cushioning pads from a hopper tube and inserting said pads into the closure caps in contact with the tacky adhesive, and/or a device for applying a protective spot on the sealing pads, as such devices have no bearing on the construction and operation of the closure cap feeding or conveying means constituting the embodiment of the invention. The assembling apparatus as shown in the accompanying drawings comprises a table 7 supported by standards 8 and arranged with bearings 9 suspended from the bottom of the table and rotatably supporting a drive shaft 10 adapted to be operatively connected to and driven from a suitable source of power, such as an electric motor, such operative connection and source of power not being shown.

The cap members c of the closures are delivered to the apparatus from a supply hopper (not shown) by a chute 11 having its delivery end extending relative to the upper stretch of an endless belt conveyer 12 supported between rollers 13 rotatably mounted in opposed upright portions 14 at the opposite ends of a plate 15 fixed to the top of the table 7, as shown in Figure 5. The belt conveyer is continuously actuated to convey the cap members from the delivery end of the chute 11 by the drive shaft 10 through a power transmission belt 16 engaged around a pulley 17 fixed on the drive shaft 10 and a pulley 18 fixed on a shaft 19 rotatably mounted in bearings 20 extending laterally from the plate 15. The shaft 19 is operatively connected to a shaft 21 of one of the rollers 13 through a beveled gear 22 fixed on a projecting end of the shaft 19 and meshing with a beveled gear 23 fixed on a projecting end of said shaft 21, as shown in Figure 1. The belt conveyer is maintained in taut condition by a roller 24 rotatably supported by blocks 25 slidably mounted in opposed vertical slideways 26 arranged on the plate 15. The blocks 25 are yieldingly urged in an upward direction by springs 27 compressed between the bottom of the blocks 25 and the bottom of the slideways 26, as shown in Figure 2. The roller 24 is adjusted to engage the lower stretch of the belt conveyer 12 against the tension of the springs 27 to take up the slack in the belt conveyer 12 by a screw 28 adjustably mounted in a plate 29 fixed to the upper ends of the side walls of the slideways 26 and extending transversely of the upper ends of the slideways with the lower end of the screws 28 abutting the upper ends of the blocks 25, as shown in Figures 2 and 5. The springs 27 will maintain the blocks 25 against the screws 28. The cap members c are guided in a single row on the belt conveyer 12 by walls 30 supported by the upright portions 14 and extending along the marginal portions of the upper stretch of the belt conveyer with one end portion of the walls juxtaposed to the side walls of the delivery end of the chute 11 and the other end portions terminating at the shaft of the roller 13 furthest from the chute and arranged with a recess 31, as shown in Figures 2 and 5, for a purpose to be hereinafter described.

The belt conveyer 12 delivers the cap members onto supporting means comprising a pair of parallelly spaced rails 32 having the opposed edges beveled, as shown at 33 in Figures 3 and 4, to engage the flaring flange portion of the cap members and slidably support the cap members without scratching the decorative surface of said cap members. The rails 32 are mounted in spaced relation to the top of the table 7 and in horizontal alinement with the flaring flange portion of the cap members on the belt conveyer 12, as shown in Figure 5, by transverse members 34 supported at the opposite ends on the top ends of leg portions of U shaped members 35 mounted on the top of the table 7 by bolts 36 engaged in the transverse members, the U shaped members and the table, as shown in dotted lines. As shown in Figures 1 and 2, the rails 32 are supported adjacent the opposite ends by the transverse members 34 and U shaped members 35. The flaring flange portion of the cap members are maintained in engagement with the beveled edges 33 of the rails 32 by longitudinal guide strips 37 mounted at one marginal portion on the rails 32 by screws 38 with the other marginal portion extending over the beveled edges 33 and the top of the cap members. The rails 32 and guide strips 37 are engaged in correspondingly shaped recesses in the underface of the transverse members 34 and the rails are secured to said transverse members by screws 39, as shown in Figures 3 and 4.

The ends of the rails 32 and guide strips 37 opposite the ends adjacent to the belt conveyer 12 terminate adjacent to a pressure drum to apply and maintain pressure on the assembled sealing pads and/or protective spots for a predetermined period to assure binding of the sealing pads to the cap members and of the protective spots to the sealing pads during the cooling of the closure caps. This pressure drum is of well known construction and is therefore shown in a diagrammatic manner as comprising a rotary table having a cap supporting shelf 40 to receive the assembled closure caps from the rails 32 and driven from the drive shaft 10 by a shaft 41 rotatably mounted in bearings 42 in the opposite ends of a sleeve 43 supported by the table 7. One end of the shaft 41 projects from the lower end of the sleeve 43 and carries a beveled gear 44 meshing with a beveled gear 45 fixed on the drive shaft 10, and the opposite end of the shaft 41 projects from a boss 46 on top of the table 7 and carries a gear 47 meshing with a gear wheel 48 connected to the pressure drum, as shown in Figure 2.

The cap members c are continuously advanced along the rails 32 from the belt conveyer 12 to the pressure drum shelf 40 relative to devices for successively applying adhesive, creating a heated zone to render the adhesive in the cap members tacky and viscous, moving sealing pads from the delivery tube of a hopper and inserting the sealing pads in the closure members in contact with the tacky adhesive, and/or applying protective spots on the sealing pads. Said assembling devices are mounted on the table 7 on either side of the rails 32 and are not shown as they would only hinder a clear reading of the drawings in respect to the embodiment of the invention.

The cap members c are advanced relative to said assembling devices by rack bars 49 and 50 having equidistantly spaced fingers 51 and 52 on one marginal portion of the respective rack bars with the space between the fingers adapted to receive the portion of the cap members extending below the rails 32. The rack bar 49 is carried at the opposite ends and actuated in a circular clockwise direction by a pair of gears 53, each gear being fixed on a reduced end of a shaft 54 rotatably mounted in a bearing 55 arranged in a boss 56 on the table 7 and in one end of a sleeve 57 fixed at said end in the table and depending from said table in encircling relation with the shaft 54 and having a bearing 58 in the lower end supporting the shaft 54, as shown in Figures 2, 3 and 4. The shafts 54 are continuously and synchronously rotated from the drive shaft 10 through a beveled gear 59 fixed on the end portion of each of said shafts 54 extending from the sleeve 57 and bearing 58 and meshing with a beveled gear 60 fixed on the drive shaft 10. The gears 53 are mounted at the opposite ends of the rack bar 49 and each gear is eccentrically connected to its associated end of the rack bar through an arm 61 pivotally mounted at one end on a pin 62 fixed to and extending upwardly from said gear 53 eccentrically of its supporting and driving shaft 54 and the opposite end of the arm 61 fixed to the associated end of the rack bar 49 by screws 63, as shown in Figures 3 and 4. The rack bar 50 is carried at the opposite ends and actuated in a circular counter-clockwise direction by a pair of gears 64 meshing with the gears 53 and each gear 64 fixed on a reduced end of a stud shaft 65 rotatable in a bearing 66 fixed at the opposite ends in a boss 67 on the top of table 7 and in said table, as shown in Figures 3 and 4. The rotation of the gears 53 by the drive shaft 10 rotates the gears 64 and actuates the rack bars 49 and 50 in circular paths of movement in opposite directions. Each gear 64 is eccentrically connected to the adjacent end of the rack bar 50 by an arm 68 pivotally mounted at one end on a pin 69 fixed in and projecting upwardly from said gear 64 eccentrically of its supporting shaft 65 and the opposite end of said arm 68 fixed to said end of the rack bar 50, as by screws 70.

The circular movements of the rack bars 49 and 50 successively move the fingers of one rack bar into engagement with the cap members to move said cap members along the rails 32 and out of engagement with said cap members while the corresponding fingers of the other rack bar are actuated out of engagement with said cap members and into position to engage and advance succeeding cap members as diagrammatically illustrated in Figure 6 in regards to the first pair of fingers 51 and 52 adjacent to the belt conveyer 12. In position a of Figure 6, the first pair of fingers 52 are shown in a position out of the forward path of travel of a cap member on the conveyer 12 toward the rails 32 and moving in a direction toward said cap member to engage the same, while the first pair of fingers 51 are at the end of their cap member advancing position out of the forward path of travel of said cap member and moving in a circular direction from the same, the cap member being indicated by the numeral 1. In position b of Figure 6, the first pair of fingers 52 are shown partly engaging and moving toward said cap member 1 while the first pair of fingers 51 are still moving in a circular path away from the path of travel of said cap member 1 in a retrograde direction. In position d of Figure 6, the fingers 52 are advancing the cap member 1 along the rails 32 from the conveyer belt 12 while the fingers 51 are in alinement with the fingers 52 and at the terminus of their movement away from the path of travel of the cap members. In position e of Figure 6, the first pair of fingers 52 are commencing their retrograde movement from the cap member 1 while the first pair of fingers 51 are moving in a position to engage a succeeding cap member 2 being delivered by the belt conveyer 12 to the rails 32. In position f, the fingers 52 are moving further away from cap 1 while the fingers 51 are moving into engagement with cap member 2. In position g, the fingers 52 are moving toward the terminus of their retrograde movement while the fingers 51 are engaging the cap members 1 and 2. In position h, the fingers 52 are at the terminus of their movement away from the rails 32 and in alinement with the fingers 51, while the fingers 51 are commencing to advance the cap members 1 and 2 along the rails 32 from the belt conveyer 12. In position i, the fingers 52 are moving toward a succeeding cap member 3 being moved by the belt conveyer 12 toward the rails 32 while the fingers 51 are moving out of engagement with the advanced cap members 1 and 2 to commence their retrograde movements.

The speed of rotation of the gears 53 and 64 is such as to actuate the rack bars 49 and 50 at a speed so that the engagement and disengagement of the fingers 51 and 52 with the cap members are in rapid succession and the forward movement of the cap members c on the rails 32 is continuous.

The recesses 31 in the side walls 30 permit the rack bars 49 and 50 and their associated fingers 51 and 52, respectively, to move relative to the belt conveyer 12 and engage the fingers with the cap members on said belt conveyer.

Having thus described my invention, I claim:

1. In closure cap assembling apparatus, means to support closure caps in a single row, a rack bar on each side of the closure cap supporting means, a pair of meshing gears at each end of the rack bar, and the rack bars eccentrically connected to the gears to be actuated by the gears in a circular path of movement in opposite directions to successively engage and move the closure caps along the supporting means.

2. In closure cap assembling apparatus, a pair of parallelly spaced rails to engage diametrically opposite flange portions of the closure caps and slidably support the closure caps therebetween with the bottom portion of the closure caps extending below said rails, a pair of guide strips mounted on the pair of rails and having a marginal portion extending over the top portion of the closure caps to retain the closure caps on the pair of rails, a rack bar below each rail of the pair of rails and having equidistantly spaced fingers to engage the bottom portion of the closure caps extending below said pair of rails, and means to actuate the rack bars in a circular path of movement in opposite directions to successively engage the fingers of the rack bars with and move the closure caps along the rails, comprising a pair of meshing gears at the opposite ends of the rack bars, and an arm fixed to the opposite ends of each rack bar and pivotally connected to each gear eccentrically of the axis of rotation thereof.

3. In closure cap assembling apparatus, a table arranged to support closure caps in a single row, a rack bar on each side of the row of closure caps, a drive shaft supported by the table and operatively connected to a source of power, a pair of meshing gears rotatably mounted on the table at each end of the row of closure caps and one gear of each pair of gears operatively connected to and driven by the drive shaft, and an arm fixed to the opposite ends of each rack bar and pivotally connected to each gear eccentrically of the axis of rotation thereof to actuate the rack bars in a circular path of movement in opposite directions and successively engage the bars with and advance the closure caps along the table.

4. In closure cap assembling apparatus, a table, a pair of rails mounted on the table in parallelly spaced relation to each other to engage diametrically opposite flange portions of the closure caps and slidably support the closure caps therebetween with the bottom portion of the closure caps extending below said rails, a closure cap delivery chute having its delivery end in spaced relation to one end of the rails, an endless belt conveyer supported by the table in the space between the delivery end of th chute and the rails to convey the closure caps from said chute toward the rails, a rack bar below each rail and having equidistantly spaced fingers to engage the portions of the closure caps extending below the rails, a pair of meshing gears rotatably supported by the table at each end of the rails, and an arm fixed to the opposite ends of each rack bar and pivotally connected to each gear eccentrically of the axis of rotation thereof to actuate the rack bars in a circular path of movement in opposite directions to successively engage the fingers with and advance the closure caps along the rails.

5. In closure cap assembling apparatus as claimed in claim 4, a drive shaft rotatably supported by the table and operatively connected to a source of power, means to operatively connect the endless belt conveyer to the drive shaft, and means to operatively connect one gear of each pair of gears to the drive shaft.

JOHN C. JOHNSON.

REFERENCES CITED

The following references are of record in the file of this patent:

UNITED STATES PATENTS

| Number | Name | Date |
|---|---|---|
| 1,227,244 | Buhles | May 22, 1917 |
| 1,469,557 | Goebel | Oct. 2, 1923 |
| 1,929,109 | Cutler | Oct. 3, 1933 |